United States Patent
Oomoto et al.

(10) Patent No.: US 7,646,591 B2
(45) Date of Patent: Jan. 12, 2010

(54) SUPPORT STRUCTURE FOR FLAT DISPLAY PANEL

(75) Inventors: Akihiro Oomoto, Hyogo (JP);
Masanori Tsukuda, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/207,890

(22) Filed: Sep. 10, 2008

(65) Prior Publication Data
US 2009/0009946 A1 Jan. 8, 2009

Related U.S. Application Data

(63) Continuation of application No. PCT/JP2006/304734, filed on Mar. 10, 2006.

(51) Int. Cl.
*H05K 7/14* (2006.01)
(52) U.S. Cl. ............. 361/679.01; 361/679.21; 248/917
(58) Field of Classification Search ......... 361/629.21, 361/679.01; 248/917
See application file for complete search history.

(56) References Cited

U.S. PATENT DOCUMENTS 6,947,093 B2 * 9/2005 Yanakawa et al. ......... 348/373
7,431,253 B2 * 10/2008 Yeh ........................ 248/286.1
2002/0163776 A1 * 11/2002 Thompson et al. ......... 361/681
2006/0066769 A1 * 3/2006 Minaguchi et al. ......... 349/58

FOREIGN PATENT DOCUMENTS

| JP | 3-47586 U | 5/1991 |
| JP | 11-190974 A | 7/1999 |
| JP | 2000-276072 A | 10/2000 |
| JP | 3220936 B2 | 10/2001 |
| JP | 2003-098510 A | 4/2003 |

OTHER PUBLICATIONS

International Search Report of PCT/JP2006/304734, date of mailing May 30, 2006.

* cited by examiner

*Primary Examiner*—Jayprakash N Gandhi
*Assistant Examiner*—Ingrid Wright
(74) *Attorney, Agent, or Firm*—Westerman, Hattori, Daniels & Adrian, LLP

(57) ABSTRACT

A support mechanism includes a support member which has a tab slidable along a groove, and can be fixed at a desired position when an engagement teeth array in the tab engages with an engagement hook. Also, a pressing member with a presser portion is movable along the engagement teeth array, and can be fixed at a desired position when an engagement hook engages with an engagement teeth array. Thus, a single front panel can be used for a number of flat display panels of different sizes.

4 Claims, 5 Drawing Sheets

SUPPORT STRUCTURE FOR FLAT DISPLAY PANEL

TECHNICAL FIELD

The present invention relates to a support structure for fixing a flat display panel to the back side of a front panel of a flat display device.

BACKGROUND ART

In a flat display device such as a liquid crystal display device, a front panel is fixed to the front surface of a main body case, and a flat display panel such as a liquid crystal display panel is fixed to the back side of the front panel. As disclosed in Patent Document 1, for example, the front panel is provided, at its back side, with a support mechanism for holding the flat display panel FIGS. 5 and 6 show a typical fixing structure for mounting a flat display panel on a front panel. FIG. 5 is a view, taken from rear, of a front panel 91 which supports and fixes a flat display panel 92. FIG. 6 is a sectional view taken along lines VI-VI in FIG. 5.

As shown in FIG. 5 and FIG. 6, the flat display panel 92 is fixed to the front panel 91 by six support mechanisms X, with the panel's front surface effective display area exposed to an opening 91a of the front panel 91. The six support mechanisms X are capable of pressing the rectangular flat display panel 92 to the front panel 91 along a margin 92a and determining the planary position of the panel. Specifically, as shown in FIG. 6, each of the support mechanisms X has a hook 95 on its tip, and an elastically deformable support member 94 which extends integrally from the back side of the front panel 91. The hook 95 is formed at a position so as to be higher, as in FIG. 6, by the amount of thickness of the flat display panel 92, than a top 91c of a rib 91b which stands on the back of the front panel 91 along the opening 91a. The inward surface of the support member 94 makes contact with the margin 92a of the flat display panel 92, and determines the planar position of the flat display panel 92. When the flat display panel 92 is pressed onto the back of the front panel 91 at a relative alignment position in relation with the front panel 91, the margin 92a of the flat display panel 92 presses the slanted surface of the hook 95 and bends the support member 94 outward, allowing the front surface of the flat display panel 92 to make contact with the top 91c of the rib 91b, whereupon the support member 94 makes an elastic return, bringing the hook 95 into engagement with the back surface of the margin 92a of the flat display panel 92 while the inner surface of the support member 94 makes elastic contact with the margin 92a of the flat display panel 92. As a result, the flat display panel 92 is supported and fixed on the back of the front panel 91, at a predetermined planar position.

Patent Document 1: JP-A-2003-98510

DISCLOSURE OF THE INVENTION

Problems to be Solved by the Invention

In the manufacture of flat display devices, there is a case where flat display panels are purchased as a component, from a plurality of manufacturers. In this case, there can be problems even if the size of the effective display area may not differ from one manufacturer to another. For example, the outside sizes of the flat display panel or the thickness thereof can be different. Sometimes the flat display panel does not have a uniform thickness along its margin. Further, flat display panels purchased from the same source have slight variations in their surface sizes and thickness.

In the conventional support mechanism X shown in FIG. 5 and FIG. 6, the support member 94 is provided at a fixed location on the back side of the front panel 91, and the hook 95 is provided at a fixed location. Therefore, if there is a difference in the outside size or in the thickness as described above, it is not possible to support and fix the flat display panel 92 appropriately. This problem can be solved by preparing different kinds of the front panel each having a unique layout pattern of their support members and hook locations for a specific one type of the flat display panel to be manufactured. However, such a solution poses other problems including a surge in the cost of molds and complication in inventory management.

The present invention was made under the above-described circumstances, and it is therefore an object of the present invention to provide a supporting structure which allows a flat display panel of various sizes to be fixed in the same front panel.

Means for Solving the Problem

According to the present invention, a supporting structure for a flat display panel is configured to support a flat display panel on the back side of a front panel of a flat display device. The back side of the front panel is provided with a plurality of support mechanisms which support the flat display panel at a plurality of positions along a marginal edge of the flat display panel. Each of the support mechanisms includes: a support member which has a contacting portion for contact with a side surface of a margin of the flat display panel; and a pressing member which is adjustably guided for a position with respect to the support member in a direction of thickness of the flat display panel, and which has a presser portion for pressing the back surface of the margin of the flat display panel.

Preferably, the support member includes a saw-teeth-like engagement teeth array in a thickness direction of the flat display panel. Each of the teeth is slanted toward a back surface of the front panel. The pressing member includes an engagement hook which is capable of elastically engaging with the engagement teeth array.

Preferably, the support member is adjustably guided and supported for a position in a planar positioning direction which is a planar direction of the flat display panel and is a direction across the marginal edge of the flat display panel.

Preferably, one of the support member and the support base includes a saw-teeth-like engagement teeth array which extends along the planary positioning direction with its teeth being slanted in one direction. The other of the support member and the support base includes an engagement hook which is engageable with the engagement teeth array.

Preferably, the engagement teeth array is formed on a surface of a first platy member which extends integrally from the support member whereas the engagement hook is formed on a second platy member which extends from the support base to overlap with the first platy member in a thickness direction. One of the first platy member and the second platy member has a plurality of through-holes each at a location different from each other in a widthwise position as well as in a longitudinal position. The other of the first platy member and the second platy member has a through-hole at a position corresponding to the widthwise position of one of the through-holes.

Other advantages and features of the present invention will become apparent from the following description of embodiments of the invention.

BEST MODE FOR CARRYING OUT THE INVENTION

Preferred embodiment of the present invention will be described below with reference to the drawings.

Figure 1:
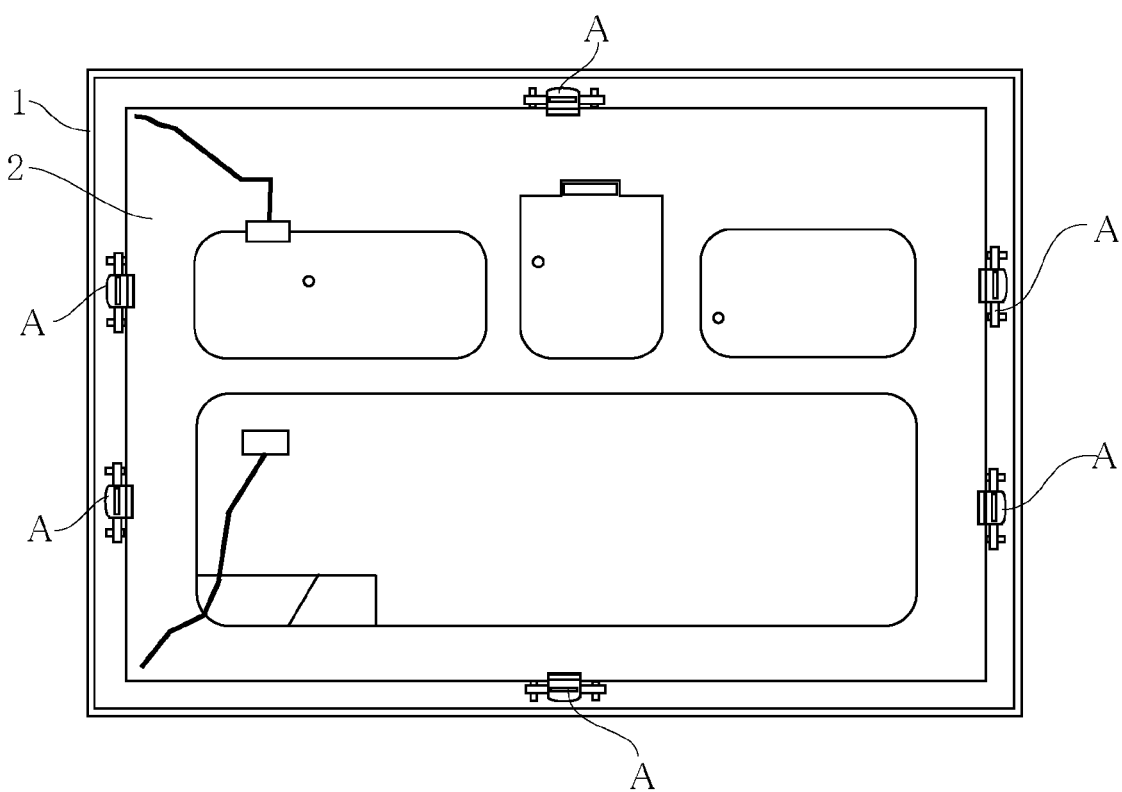
FIG. 1 is a rear view of a front panel which is provided with a supporting structure according to the present invention.
Figure 2:
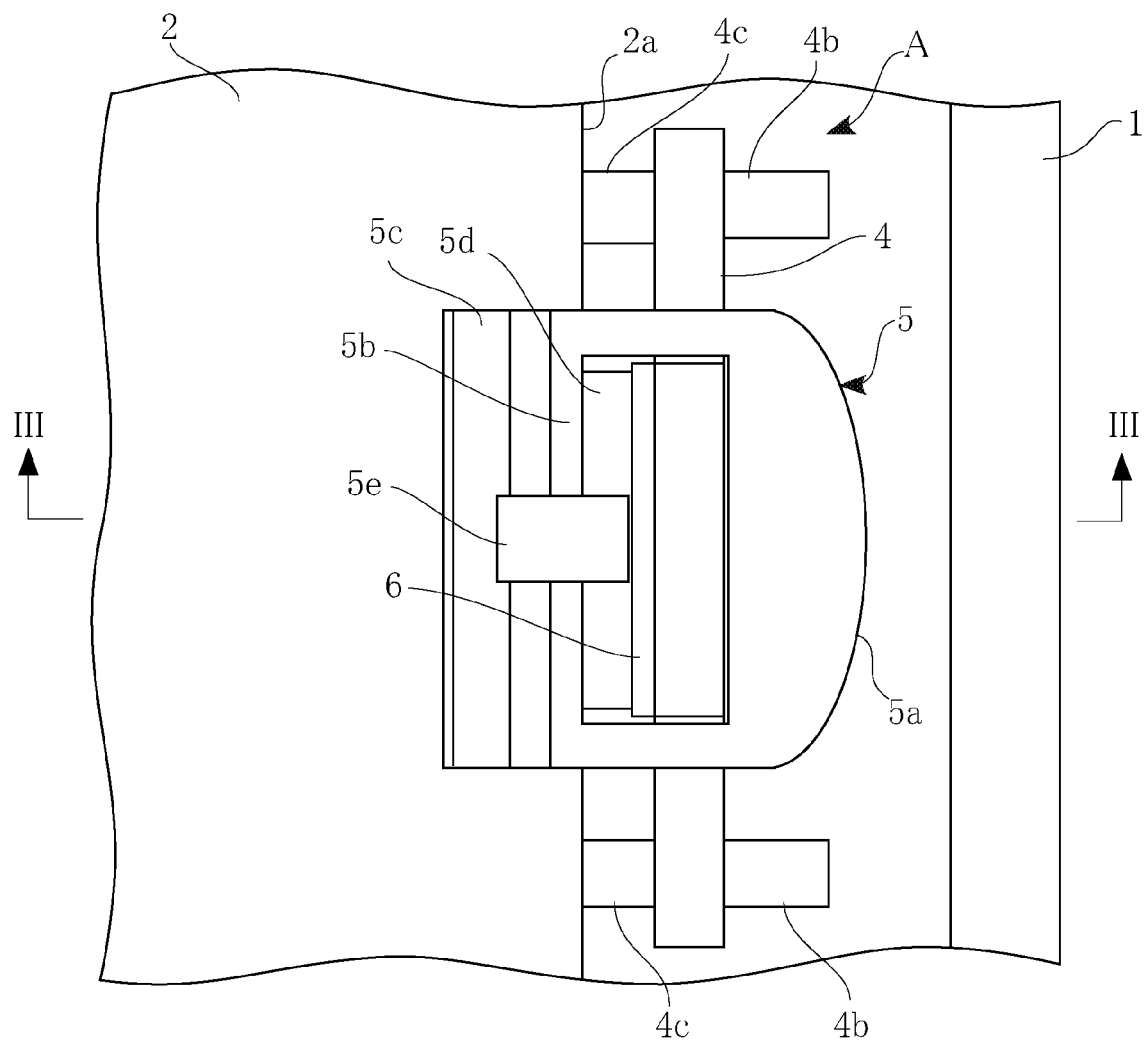
FIG. 2 is an enlarged view of a support mechanism A and its proximity shown in FIG. 1.

A supporting structure according to the present invention is used, for example, in a flat display device such as a liquid crystal display device, to support and fix a flat display panel, such as a liquid crystal panel, on the back side of a front panel mounted on a front face of a main body case. FIG. 1 is a rear view of a front panel 1 in the state of supporting and fixing a flat display panel 2. As shown in FIG. 1, the front panel 1 is provided, on its back side, with six support mechanisms A for supporting and fixing the rectangular flat display panel 2. One support mechanism A is disposed on each of the two, opposed long sides of the flat display panel 2, and two support mechanisms A are disposed on each of the two, opposed short sides; thus, the flat display panel 2 is pressed from four directions in FIG. 1. Such a support mechanism A and its proximity as described are shown in FIG. 2. Further, a sectional view taken along line III-III in FIG. 2 is shown in FIG. 3.

Figure 3:
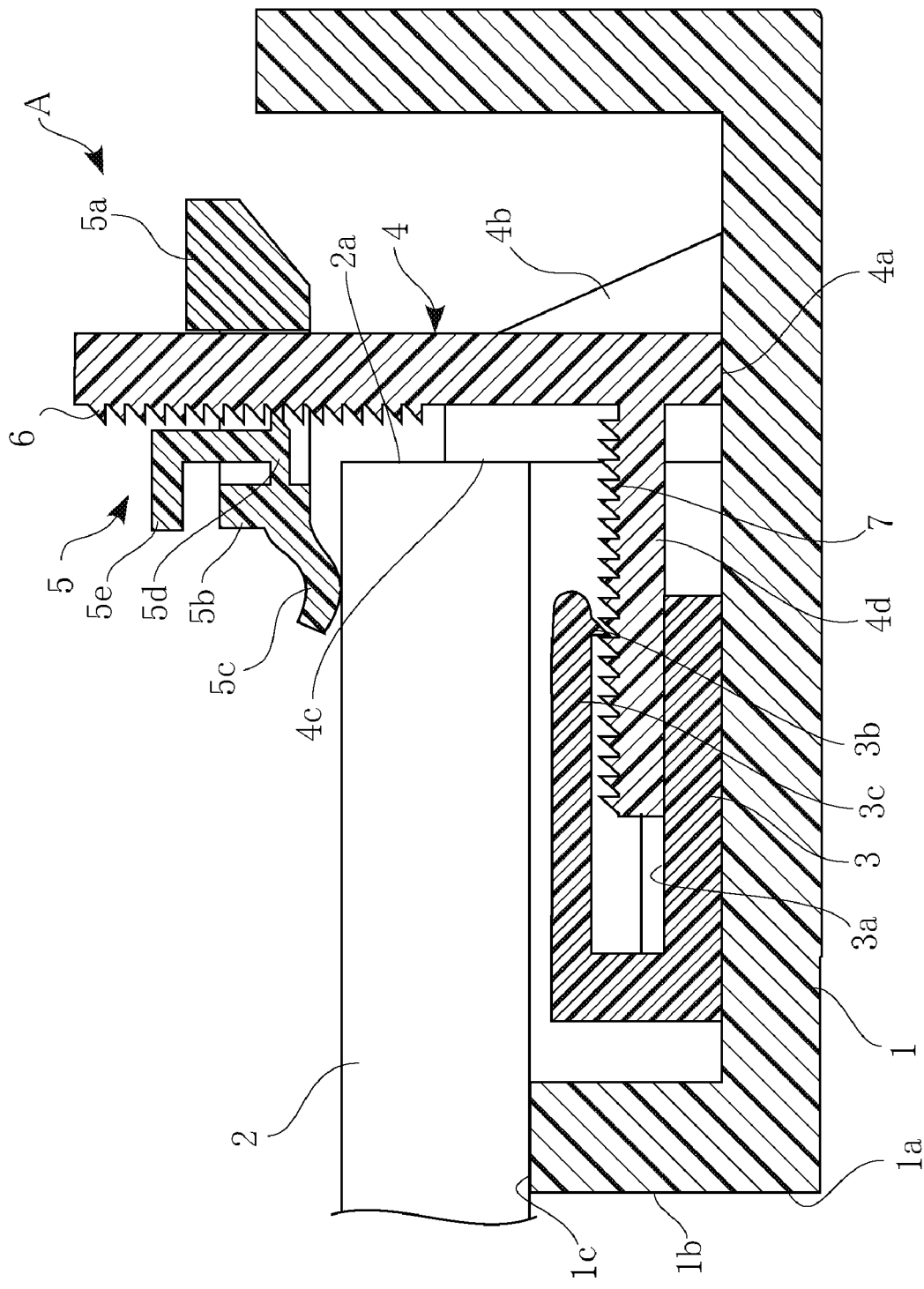
FIG. 3 is a sectional view taken along line III-III in FIG. 2.

As shown in FIG. 2 and FIG. 3, the support mechanism A includes a support base 3 which is provided integrally with the front panel 1, a support member 4 whose position planary of the flat display panel 2 is adjustable with respect to the support base 3, and a pressing member 5 which is adjustable in its location with respect to the support member 4 in a thickness direction of the flat display panel 2 and is capable of pressing the back side of the flat display panel 2 near margin. The front panel 1 has an opening 1a for exposing an effective display area which is an area on the front side of the flat display panel 2. On the back side of the opening 1a, ribs 1b extend and their respective tops 1c support the front surface of the flat display panel 2.

The support member 4 is platy, having a base end 4a pressed against the back surface of the front panel 1, having a predetermined width and extending in the thickness direction of the flat display panel 2, and is made of a resin for example. On the outer-surface side of the support member 4, two triangular anti-falling ribs 4b are integrally formed, at a distance from each other in the width direction, whereas on the inner-surface side, an engagement teeth array 6 which looks like saw teeth is formed, with each of the teeth slanted toward the back surface of the front panel 1. Also, on the inner-surface side of the support member 4, two rib-like contacting portions 4c are formed at a distance from each other in the width direction. The contacting portions 4c are formed so that they make appropriate contact with a marginal side surface 2a of the flat display panel 2. Further, tabs 4d each having a constant width and extending inward are integrally formed. On the upper surface, as in FIG. 3, of the tab 4d, an engagement teeth array 7 which looks like saw teeth is formed, with each of the teeth slanted outward of the flat display panel 2.

As shown in FIG. 2, the pressing member 5 is a substantially frame-like member, and is fitted around a portion of the support member 4 where the engagement teeth array 6 is provided. The pressing member 5 has an outer frame portion 5a which serves as an operation portion when pressing the entire pressing member 5 down into a position. The pressing member 5 has an inner frame portion 5b which has an outer surface formed, integrally therewith, with a leaf-spring like presser portion 5c for elastically pressing the marginal back surface of the flat display panel 2. The inner frame portion 5b has an inner surface formed, integrally therewith, with an engagement hook 5d which is capable of making elastic engagement with the engagement teeth array 6. The engagement hook 5d is also formed, integrally therewith, with a disengagement lever 5e which allows the engagement hook 5d to be bent forcibly for disengagement from the engagement teeth array 6.

The support base 3 has an upper surface, as in FIG. 3, formed with a groove 3a for the tab 4d of the support member 4 to fit. The tab 4d is then guided in its longitudinal direction. The support base 3 also has an engagement hook 3b which is formed integrally via an arm 3c and is capable of elastically engaging with the engagement teeth array 7 formed on the upper surface of the tab 4d as in FIG. 3. The direction in which the support base 3 guides the tab 4d should be a direction across the marginal edge of the flat display panel 2.

Figure 4:
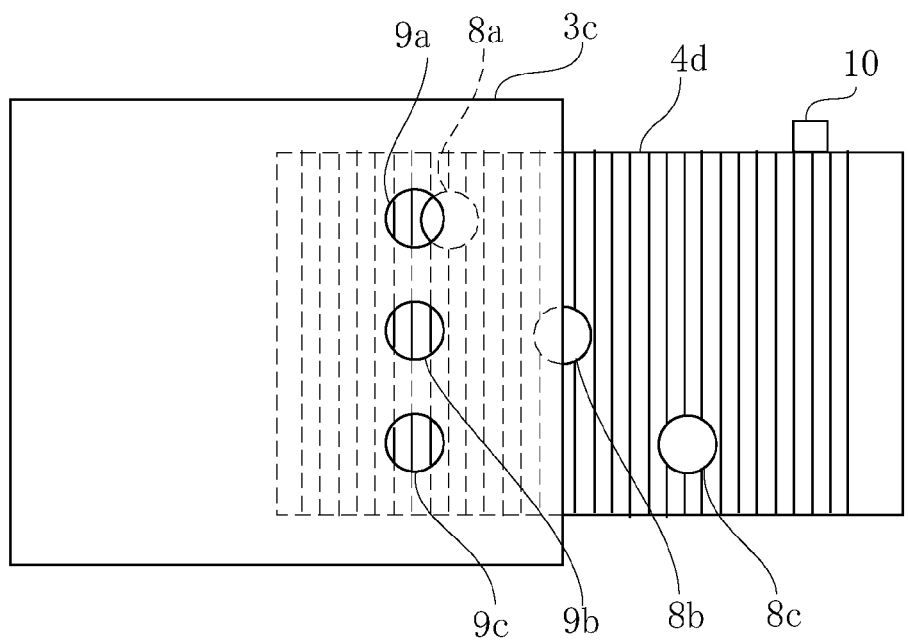
FIG. 4 is a view of a support base shown in FIG. 3, with a tab inserted.
Figure 5:
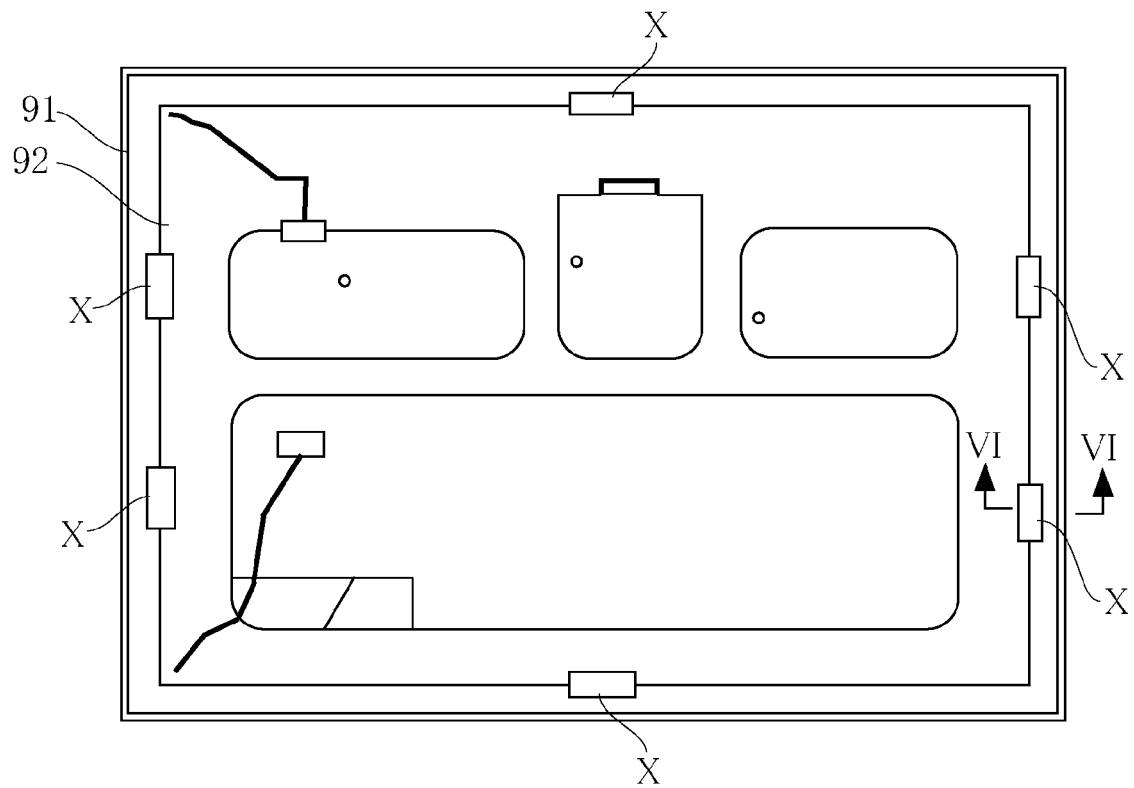
FIG. 5 is a rear view of a front panel provided with a conventional supporting structure.
Figure 6:
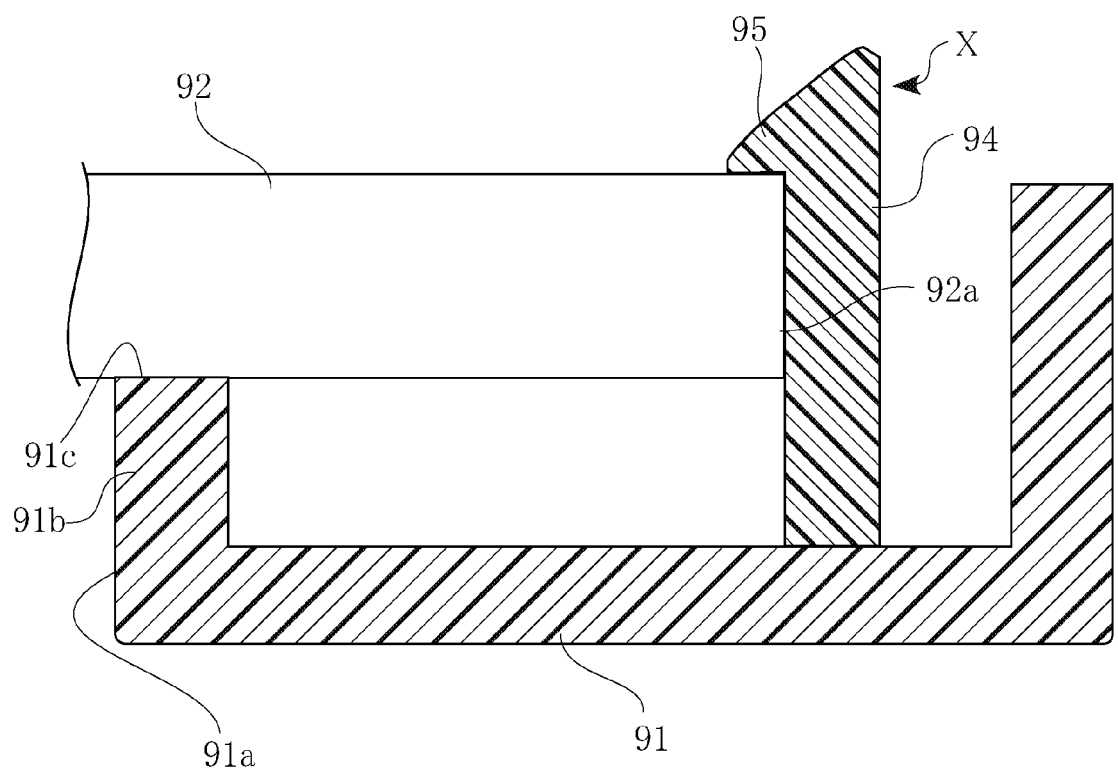
FIG. 6 is a sectional view taken along line VI-VI in FIG. 5.

FIG. 4 shows the arm 3c and the tab 4d overlapping with each other at a position, for a purpose of describing their relationship. FIG. 4 does not show the flat display panel 2, the pressing member 4 or others. Note, also, that the right-and-left direction as in FIG. 4 is the direction across the marginal edge of the flat display panel 2, with the left-hand side being inward and the right-hand side being outward of the flat display panel 2. As shown in FIG. 4, the tab 4d has a surface opposed to the arm 3c, and on this surface, three through-holes 8a, 8b, 8c are provided. These through-holes 8a, 8b, 8c run from the upper surface to the lower surface of the tab 4d in the thickness direction. The through-holes 8a, 8b, 8c are laid longitudinally of the arm 3c, sequentially from up to down as in FIG. 4, at a predetermined interval. On the other hand, the arm 3c has three through-holes 9a, 9b, 9c running in its thickness direction. These through-holes 9a, 9b, 9c lie more inward than the engagement hook 3b of the arm 3c, in line in the widthwise direction. Also, the tab 4d is formed with an upward projection 10 at an outward location on its upper side surface as in FIG. 4.

When the tab 4d is inserted into the groove 3a which is formed in the support base 3, and as the tab 4d is moved inward, the through-hole 8a comes in alignment with the through-hole 9a. When the tab 4d is moved further inward from this state, the through-hole 8b comes in alignment with the through-hole 9b, and then the through-hole 8c comes in alignment with the through-hole 9c. Note that the tab 4d may be moved inward until the projection 10 makes contact with the support base 3. Now, when the tab 4d comes to a location where any of the pairs of through-holes 8a, 8b, 8c, 9a, 9b, 9c come in alignment, or when the projection 10 makes contact with the support base 3, the contacting portion 4c comes to a specific location defining a predetermined one of different sizes of the flat display panel 2. Specifically, a location of the contacting portion 4c when the through-hole 8a comes in alignment with the through-hole 9a represents a position where a certain flat display panel 2 can be supported on its sides. Further, at this location, the effective display area of the flat display panel 2 exposed from the opening 1a comes to a proper position. The same is true for the case where the through-hole 8b comes in alignment with the through-hole 9b, the case where the through-hole 8c comes in alignment with the through-hole 9c, and the case where the projection 10 makes contact with the support base 3.

Next, a function provided by these support mechanisms A will be described.

In the support mechanisms A, contacting portions 4c make contact with marginal side surface 2a of a flat display panel 2, and determines the planar position of the flat display panel 2. Also, presser portions 5c press the back surface of the flat display panel 2. On the other hand, the top surface of the flat display panel 2 is supported by the tops 1c of the ribs 1b which stand on the back side of the opening 1a of the front panel 1. Specifically, the flat display panel 2 is pinched by the tops 1c and the presser portions 5c of the ribs 1b from the front and the back sides, with the marginal side surface 2a pressed by contacting portions 4c from four directions, thereby supported and fixed on the back surface of the front panel 1.

According to the support mechanism A, the pressing member 5 can be tentatively secured on the support member 4 by making the engagement hook 5d engage with the engagement teeth array 6, and also can be pressed down toward the back surface of the front panel 1 due to the shape of the engagement teeth array 6 and of the engagement hook 5d. Each tooth on the engagement teeth array 6 is horizontal on its face toward the back surface of the front panel 1, and therefore engageable with the engagement hook 5d. Thus, it is not possible to move the pressing member 5 in the direction away from the back surface of the front panel 1, but by using the disengagement lever 5e and thereby forcibly bending the engagement hook 5d, it becomes possible to move the pressing member along the engagement teeth array 6 and eventually to remove it from the support member 4.

In the support mechanism A, the support member 4 is supported by the tab 4d which is inserted into the groove 3a formed in the support base 3, and also by the base end 4a which is pressed onto the back surface of the front panel 1. When the engagement teeth array 7 formed on the tab 4d makes engagement with the engagement hook 3b, the support member 4 is fixed at a planar position. Each tooth on the engagement teeth array 7 is vertical on its face toward the outer side of the flat display panel 2, and therefore movement of the tab 4d in the outward direction is restricted whereas it is possible to press and move the tab inward of the flat display panel 2. However, by bending the arm 3c, it becomes possible to move the engagement hook 3b away from the engagement teeth array 7 and therefore move the tab 4d along the groove 3a in whichever way, inward and outward, of the flat display panel 2.

As has been described, in the support mechanism A, it is possible to move the contacting portion 4c and the presser portion 5c for supporting and fixing the flat display panel 2, in a predetermined direction, pitch by pitch of the engagement teeth arrays 6, 7. Therefore, flat display panels 2 of different outside sizes and thicknesses can be positioned and fixed on the back surface of the front panel 1 while allowing the entire effective display area of these flat display panels 2 to be exposed to the opening 1a. Positional adjustment is possible in each support mechanism A for each contacting portion 4c, which makes it possible to perform the fixing and positioning described above even in a case where the flat display panel 2 is erroneous in its planar sizes and/or thickness.

When fixing a flat display panel 2 on the back of the front panel 1 with support mechanisms A, the following procedure may be used for example. Assume that in the following example, the flat display panel 2 has a size appropriate to a case where the through-hole 8a comes in alignment with the through-hole 9a.

First, in all of the six support mechanisms A, the pressing member 5 is removed from the support member 4, the tab 4d is inserted into the groove 3a, and the support member 4 is slid into a position where the through-hole 8a comes in alignment with the through-hole 9a. Next, the flat display panel 2 is placed on the tops 1c of the ribs 1b, along the contacting portions 4c. The support mechanism A is designed so that the position where the through-hole 8a comes in alignment with the through-hole 9a is the position where the contacting portions 4c make contact with the marginal side surface 2a of this flat display 2, and where the effective display area of the flat display panel 2 is exposed to the opening 1a.

Next, an inspection is performed to see if the effective display area of the flat display 2 is properly exposed to the opening 1a and if each contacting portion 4c makes contact with the corresponding marginal side surface 2a of the flat display panel 2. If the placement is incorrect, the position of the support member 4 is adjusted at any of the contacting portions 4c to achieve a correct placement. Thereafter, the pressing member 5 is fitted into the support member 4, and the outer frame portion 5a is pressed to slide the pressing member 5 until the presser portion 5c exerts an elastic press onto the back of the marginal side surface 2a of the flat display panel 2.

According to the procedure described above, it is possible to fix the flat display panel 2 smoothly, on the back side of the front panel 1 while simultaneously achieving the positioning so that the effective display area of the flat display panel 2 is exposed to the opening 1a. It should be noted here that the same procedure is applicable to all the other flat display panels 2 for the remaining combinations of the through-holes as well as for the case where the support base 3 makes contact with the projection 10.

However, the above-described method of fixing and positioning is only an example, and the pressing member 5 may not necessarily be removed from the support member 4 during the placement. In this case, the above-described method is used for two on the right side and one on the upper side as in FIG. 1, of the six support mechanisms A, to determine the position of the support member 4. For the other support mechanisms A, only the tip of the tab 4d is inserted into the groove 3a to begin placement. Specifically, in the support mechanisms A on the left side and on the lower side as in FIG. 1, the support members 4 are closer to the outside, and therefore the flat display panel 2 can be placed on the tops 1c of the ribs 1b without being disturbed by the inward extending pressing members 5. After the placement, each support member 4 is slid and subsequently, the pressing members 5 are slid to achieve fixing and positioning the flat display panel 2.

As described, a front panel 1 which is provided with support mechanisms A can support and fix a flat display panel 2 even if there is variation in the outside sizes and thickness. This makes possible to use only one kind of front panel 1, which leads to cost reduction. Further, the support mechanism A allows minor adjustment when there are dimensional errors in the outside sizes and/or the thickness within a given product type of the flat display panels 2.

The scope of the present invention is not limited to the disclosure made in the above-described embodiment. Rather, any variations within the range of description given in each claim are included in the scope of present invention. For example, the number of the through-holes is discretionary and so is the number of the support mechanisms as far as the number provides a minimum necessary level of support and fixation.

The invention claimed is:

1. A supporting structure for supporting a flat display panel on a back side of a front panel of a flat display device, comprising:
    a plurality of support mechanisms for supporting the flat display panel at a plurality of positions along a marginal edge of the flat display panel, each said plurality of support mechanisms being disposed on the back side of the front panel and including
        a support member including a contacting portion for contact with a side surface of a margin of the flat display panel; and
        a pressing member adjustably guided for a position with respect to the support member in a direction of thickness of the flat display panel and having a presser portion for pressing a back surface of the margin of the flat display panel,
    wherein the support member further includes a saw-teeth-like engagement teeth array in a thickness direction of the flat display panel, each of the teeth being slanted toward a back surface of the front panel, the pressing member including an engagement hook capable of elastically engaging with the saw-teeth like engagement teeth array.

2. The supporting structure according to claim 1, wherein the support member is adjustably guided and supported for a position in a planar positioning direction which is a planar direction of the flat display panel and is a direction across the marginal edge of the flat display panel.

3. The supporting structure according to claim 2, wherein one of the support member and a support base includes a saw-teeth-like engagement teeth array extending along the planary positioning direction with its teeth being slanted in one direction, the other of the support member and the support base including an engagement hook engageable with the saw-teeth like engagement teeth array.

4. The supporting structure according to claim 3,
    wherein the saw-teeth like engagement teeth array is formed on a surface of a first platy member which extends integrally from the support member,
    wherein the engagement hook is formed on a second platy member which extends from the support base to overlap with the first platy member in a thickness direction, and
    wherein one of the first platy member and the second platy member has a plurality of through-holes, each at a location different from each other in a widthwise position and as in a longitudinal position, and
    wherein the other of the first platy member and the second platy member has a through-hole at a position corresponding to the widthwise position of one of the plurality of through-holes.

* * * * *